United States Patent
Choi et al.

(10) Patent No.: US 10,388,998 B2
(45) Date of Patent: Aug. 20, 2019

(54) BATTERY PACK OF NOVEL AIR COOLING STRUCTURE

(71) Applicant: LG CHEM, LTD., Seoul (KR)

(72) Inventors: Ji Young Choi, Yongin-si (KR); Bum Hyun Lee, Daejeon (KR); Chae Ho Chung, Daejeon (KR); Yong Seok Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 629 days.

(21) Appl. No.: 14/324,711

(22) Filed: Jul. 7, 2014

(65) Prior Publication Data
US 2014/0322583 A1 Oct. 30, 2014

Related U.S. Application Data (63) Continuation of application No. PCT/KR2013/000932, filed on Feb. 6, 2013.

(30) Foreign Application Priority Data

Feb. 7, 2012 (KR) .................. 10-2012-0012255

(51) Int. Cl.
*H01M 10/625* (2014.01)
*H01M 10/613* (2014.01)
(Continued)

(52) U.S. Cl.
CPC .......... *H01M 10/613* (2015.04); *B60L 3/0046* (2013.01); *B60L 50/64* (2019.02);
(Continued)

(58) Field of Classification Search
CPC .............................. H01M 4/386; H01M 4/133
See application file for complete search history.

(56) References Cited

U.S. PATENT DOCUMENTS 5,937,664 A * 8/1999 Matsuno ............ B60H 1/00278
62/186
2007/0031728 A1 2/2007 Lee et al.
(Continued)

FOREIGN PATENT DOCUMENTS

EP 1026770 A1 8/2000
EP 1753070 A1 2/2007
(Continued)

OTHER PUBLICATIONS

Translation of JP 2008-254627.*
(Continued)

*Primary Examiner* — Osei K Amponsah
(74) *Attorney, Agent, or Firm* — Morgan, Lewis & Bockius LLP (57) ABSTRACT

Disclosed herein is a battery pack including a plurality of battery modules, each having a battery cell or a unit module (unit cell) that can be charged and discharged, mounted in a pack case, wherein two or more unit cells constitute one battery module, two or more battery modules are arranged in a length direction of the battery pack to constitute one battery module group, two battery module groups are arranged in a width direction of the battery pack in a state in which the battery module groups are spaced apart from each other such that a coolant discharge part is defined between the battery module groups, a coolant inlet port is independently formed at a region of the pack case corresponding to each of the battery modules located at a position opposite to the coolant discharge part, and a coolant outlet port is formed at a front or a rear of the pack case in the length direction of the battery pack such that coolant introduced through the respective coolant inlet ports cools the unit cells of the respective battery modules while passing through the
(Continued)

respective battery modules and is then discharged out of the pack case.

20 Claims, 10 Drawing Sheets

(51) Int. Cl.
*H01M 2/02* (2006.01)
*B60L 3/00* (2019.01)
*H01M 10/6557* (2014.01)
*H01M 10/6555* (2014.01)
*B60L 58/26* (2019.01)
*B60L 50/64* (2019.01)
*H01M 10/617* (2014.01)

(52) U.S. Cl.
CPC .......... *B60L 58/26* (2019.02); *H01M 2/0237* (2013.01); *H01M 10/625* (2015.04); *H01M 10/6555* (2015.04); *H01M 10/6557* (2015.04); *B60L 2240/545* (2013.01); *H01M 10/617* (2015.04); *Y02T 10/7005* (2013.01); *Y02T 10/705* (2013.01)

(56) References Cited

U.S. PATENT DOCUMENTS

| | | | |
|---|---|---|---|
| 2008/0026284 A1* | 1/2008 | Fujii | H01M 2/105 429/120 |
| 2008/0220319 A1 | 9/2008 | Takagi et al. | |
| 2008/0248379 A1 | 10/2008 | Takeuchi et al. | |
| 2011/0177367 A1* | 7/2011 | Chung | H01M 2/1077 429/83 |
| 2011/0189521 A1 | 8/2011 | Lee et al. | |
| 2012/0183822 A1 | 7/2012 | Chung et al. | |

FOREIGN PATENT DOCUMENTS

| | | |
|---|---|---|
| EP | 1970981 A2 | 9/2008 |
| JP | 2000-243461 A | 9/2000 |
| JP | 2001-105894 A | 4/2001 |
| JP | 2005-247168 A | 9/2005 |
| JP | 2006-120334 A | 5/2006 |
| JP | 2006-324037 A | 11/2006 |
| JP | 2008-34297 A | 2/2008 |
| JP | 2008-226488 A | 9/2008 |
| JP | 2008-258027 A | 10/2008 |
| JP | 2008254627 A * | 10/2008 |
| JP | 2011119102 A * | 6/2011 |
| KR | 10-2007-0014661 A | 2/2007 |
| KR | 10-093789 B1 | 1/2010 |
| KR | 10-2011-0019490 A | 2/2011 |
| WO | WO 2012158185 * | 11/2012 |

OTHER PUBLICATIONS

Translation of JP 2011-119102.*
International Search Report issued in PCT/KR2013/000932, dated May 15, 2013.

* cited by examiner

BATTERY PACK OF NOVEL AIR COOLING STRUCTURE

CROSS REFERENCE TO RELATED APPLICATIONS

This application is a Bypass Continuation of PCT International Application No. PCT/KR2013/000932 filed on Feb. 6, 2013, which claims priority under 35 U.S.C. § 119(a) to Patent Application No. 10-2012-0012255 filed in the Republic of Korea on Feb. 7, 2012, all of which are hereby expressly incorporated by reference into the present application.

TECHNICAL FIELD

The present invention relates to a battery pack having a novel air cooling structure and, more particularly, to a battery pack including a plurality of battery modules, each having a battery cell or a unit module (unit cell) that can be charged and discharged, mounted in a pack case, wherein two or more unit cells constitute one battery module, two or more battery modules are arranged in a length direction of the battery pack to constitute one battery module group, two battery module groups are arranged in a width direction of the battery pack in a state in which the battery module groups are spaced apart from each other such that a coolant discharge part is defined between the battery module groups, a coolant inlet port is independently formed at a region of the pack case corresponding to each of the battery modules located at a position opposite to the coolant discharge part, and a coolant outlet port is formed at a front or a rear of the pack case in the length direction of the battery pack such that coolant introduced through the respective coolant inlet ports cools the unit cells of the respective battery modules while passing through the respective battery modules and is then discharged out of the pack case.

BACKGROUND ART

Recently, a secondary battery, which can be charged and discharged, has been widely used as an energy source for wireless mobile devices. In addition, the secondary battery has attracted considerable attention as a power source for electric vehicles (EV) and hybrid electric vehicles (HEV), which have been developed to solve problems, such as air pollution, caused by existing gasoline and diesel vehicles using fossil fuels.

Small-sized mobile devices use one or several battery cells per device. On the other hand, middle or large-sized devices, such as vehicles, use a middle or large-sized battery module having a plurality of battery cells electrically connected to one another because high output and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently focused on the pouch-shaped battery, which uses an aluminum laminate sheet as a sheathing member, because the pouch-shaped battery is lightweight, the manufacturing cost of the pouch-shaped battery is low, and it is possible to easily modify the shape of the pouch-shaped battery.

In order for the middle or large-sized battery module to provide output and capacity required by a specific apparatus or device, it is necessary for the middle or large-sized battery module to be configured to have a structure in which a plurality of battery cells is electrically connected in series to each other or in series and parallel to each other and the battery cells are stable against external force.

In addition, the battery cells constituting the middle or large-sized battery module may be secondary batteries which can be charged and discharged. Consequently, a large amount of heat is generated from such high-output, large-capacity secondary batteries during charge and discharge of the secondary batteries. If the heat, generated from the unit battery during charge and discharge of the unit battery, is not effectively removed from the unit battery, the heat accumulates in the unit battery with the result that deterioration of the unit battery is accelerated. According to circumstances, the unit battery may catch fire or explode. For this reason, a battery pack for vehicles, which is a high-output, large-capacity battery, needs a cooling system to cool battery cells mounted in the battery pack.

Meanwhile, a power storage device is generally configured to have a structure in which a plurality of battery packs is mounted in a rack in a drawer-typed packaging manner. Drawer-typed packaging means inserting a series of battery packs in one rack in a state in which the battery packs are vertically stacked. In a case in which a cooling system is configured for the battery packs provided in the power storage device, it is difficult to achieve high cooling efficiency in a structure in which battery modules are arranged in a state in which a flow channel is vertically formed in each battery module to cool battery cells or unit modules.

That is, it is difficult to provide a space necessary to form the flow channel at the upper part and the lower part of each battery pack because the battery packs are vertically stacked. For this reason, it is necessary to dispose the battery modules in a state in which the battery modules are laid down such that the battery packs are mounted in a drawer-typed packaging manner in order to achieve cooling while improving spatial efficiency.

In addition, the power storage device requires high energy density and uniform lifespan and performance of the batteries. Consequently, a compact design is needed even when the rack is configured as well as when the battery pack is configured.

Figure 1:
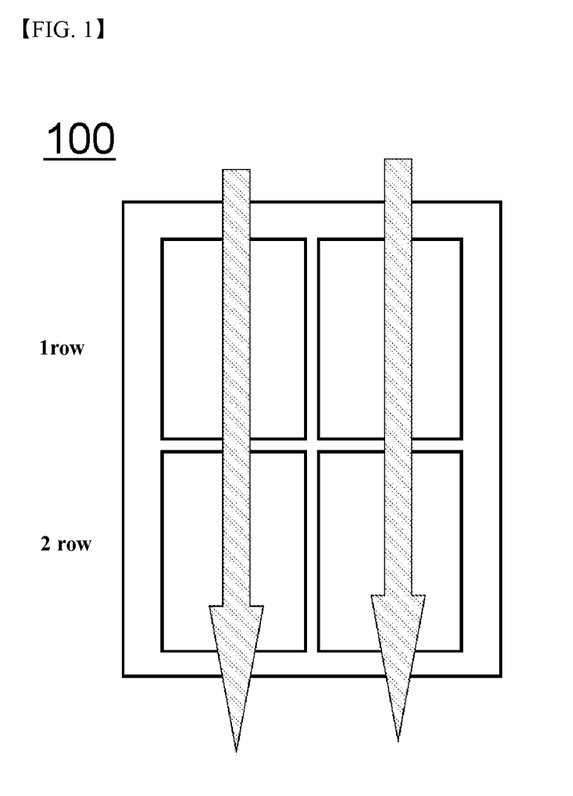
FIG. 1 is a plan view showing a conventional battery pack.

For spatial utilization, for example, battery modules may be disposed in a battery pack 100 and coolant flow channels may be formed in the battery pack 100 as shown in FIG. 1. In a case in which the battery modules are arranged in a direction in which the coolant flow channels are formed, however, external air is directly introduce into first row battery modules but air having absorbed heat from the first row battery modules, i.e. heated air, is introduced into second row battery modules. As a result, cooling efficiency of the second row battery modules is lower than that of the first row battery modules, whereby lifespan of battery cells constituting the battery modules is shortened.

Consequently, there is a high necessity for technology to fundamentally solve the above problems.

DISCLOSURE

Technical Problem

Therefore, the present invention has been made to solve the above problems and other technical problems that have yet to be resolved.

It is an object of the present invention to provide a battery pack configured to have a structure in which two battery module groups are arranged in a width direction of the battery pack in a state in which the battery module groups are spaced apart from each other such that a coolant discharge part is defined between the battery module groups to minimize temperature deviation and differential pressure caused between different row battery modules or unit cells, thereby restraining deterioration in performance of the battery modules or unit cells and improving cooling efficiency.

Technical Solution

In accordance with one aspect of the present invention, the above and other objects can be accomplished by the provision of a battery pack including a plurality of battery modules, each having a battery cell or a unit module (unit cell) that can be charged and discharged, mounted in a pack case, wherein two or more unit cells constitute one battery module, two or more battery modules are arranged in a length direction of the battery pack to constitute one battery module group, two battery module groups are arranged in a width direction of the battery pack in a state in which the battery module groups are spaced apart from each other such that a coolant discharge part is defined between the battery module groups, a coolant inlet port is independently formed at a region of the pack case corresponding to each of the battery modules located at a position opposite to the coolant discharge part, and a coolant outlet port is formed at a front or a rear of the pack case in the length direction of the battery pack such that coolant introduced through the respective coolant inlet ports cools the unit cells of the respective battery modules while passing through the respective battery modules and is then discharged out of the pack case.

As described above, the battery pack according to the present invention is configured to have a structure in which the two battery module groups are arranged in the width direction of the battery pack in a state in which the battery module groups are spaced apart from each other such that the coolant discharge part is defined between the battery module groups. Consequently, it is not necessary to form a coolant discharge part at the upper part or the lower part of the pack case and, therefore, it is possible to configure the battery pack such that the battery pack has a compact structure in a vertical direction.

In addition, the battery pack according to the present invention is configured to have a structure in which the coolant inlet port is independently formed at the region of the pack case corresponding to each battery module located at the position opposite to the coolant discharge part. Consequently, it is possible to reduce the flow length and flow speed of the coolant by half and, therefore, it is possible to reduce temperature deviation and differential pressure caused in the battery modules in a flow direction of the coolant.

In a concrete example, each coolant inlet port may be formed at the pack case while having a structure including a plurality of through holes or slits. In this case, it is not necessary to provide an additional coolant introduction space. In addition, it is possible to introduce a large amount of coolant from the outside at once through the coolant inlet ports with the above-stated construction.

The structure of the pack case is not particularly restricted so long as the battery modules can be easily mounted in the pack case. For example, the pack case may include a lower case, in which the battery modules are mounted, and an upper case to cover a top of the lower case.

In another concrete example, the battery modules may be spaced apart from the pack case, at which the coolant inlet ports are formed, such that coolant flow sections, in which the coolant introduced through the coolant inlet ports is distributed and then moves to the battery modules, are defined between the pack case and the battery modules. Consequently, the coolant is distributed in the coolant flow sections and then moves to the battery modules to cool the battery modules, thereby achieving uniform cooling.

Meanwhile, various structures may be provided to uniformly cool the respective battery modules.

For example, the respective battery modules constituting the battery module groups may have the same width and flow speed or flow rate of the coolant introduced into the battery modules may be set such that the flow speed or the flow rate of the coolant introduced into the battery module away from the coolant outlet port is higher than the flow speed or the flow rate of the coolant introduced into the battery module adjacent to the coolant outlet port.

Specifically, the flow speed or the flow rate of the coolant at the battery module groups may be set to be linearly increased along longitudinal arrangement of the battery modules, whereby it is possible uniformly cool the battery modules.

In another example, the flow speed or the flow rate of the coolant introduced into the respective battery modules constituting the battery module groups may be set to be uniform and widths of the battery modules, through which the coolant passes, may be set such that the width of the battery module away from the coolant outlet port is less than the width of the battery module adjacent to the coolant outlet port.

Specifically, the widths of the respective battery modules constituting the battery module groups may be set to be linearly decreased along longitudinal arrangement of the battery modules, whereby it is possible to uniformly cool the battery modules.

The coolant discharge part may have a width equivalent to 5 to 50% the width of the battery pack.

Specifically, if the width of the coolant discharge part is less than 5% the width of the battery pack, it is difficult to achieve desired coolant uniformity, which is not preferable. On the other hand, if the width of the coolant discharge part is greater than 50% the width of the battery pack, the overall size of the battery pack is increased, which is also not preferable.

Meanwhile, each battery module may include a coolant flow channel extending to the coolant outlet port in a "¬" shape.

According to circumstances, a driving fan to provide flow driving force to the coolant may be further mounted in each coolant inlet port and/or the coolant outlet port such that the coolant, introduced through each coolant inlet port, passes through the battery modules, rapidly and smoothly moves to the coolant outlet port, and is discharged out of the battery pack.

In another concrete example, the coolant inlet ports and/or the coolant outlet port may be connected to an air conditioner system.

Specifically, the coolant inlet ports may be connected to an air conditioner system of a vehicle such that cooled air, i.e. low-temperature air, is introduced through the coolant inlet ports. Consequently, it is possible to much more efficiently cool the unit cells using the low-temperature air introduced from the air conditioner system.

In addition, the size of the coolant outlet port of the battery pack according to the present invention is less than that of a coolant outlet port of a conventional battery pack. In a case in which the battery pack according to the present invention is connected to the air conditioner system, therefore, it is possible to achieve a material saving effect in terms of configuration of the air conditioner system.

Meanwhile, the battery pack according to the present invention is preferably used in a structure in which cooling efficiency is particularly serious, i.e. a structure in which the length of the battery pack is 1.1 times or more the width of the battery pack, and more preferable in a structure in which the length of the battery pack is 1.2 times to 6 times the width of the battery pack.

The battery pack may be symmetric with respect to the coolant discharge part in order to achieve uniform flow of the coolant. Consequently, it is possible to greatly reduce the length of the coolant flow channel as compared with a conventional coolant flow channel.

Each battery module may include 8 to 24 unit cells.

For reference, the term "battery module" used in the specification inclusively means the structure of a battery system configured to have a structure in which two or more chargeable and dischargeable battery cells or unit modules are mechanically fastened and, at the same time, electrically connected to each other to provide high output and large capacity. Therefore, the battery module itself may constitute a single apparatus or a part of a large-sized apparatus. For example, a large number of small-sized battery modules may be connected to each other to constitute a large-sized battery module. Alternatively, a small number of battery cells may be connected to each other to constitute a unit module and a plurality of the unit modules may be connected to each other.

The unit cells may be spaced apart from each other by a size equivalent to 5 to 50% the thickness of each unit cell such that the coolant effectively cools the unit cells while passing between the unit cells.

For example, if the distance between the unit cells is less than 5% the thickness of each unit cell, it is difficult to achieve a desired coolant cooling effect, which is not preferable. On the other hand, if the distance between the unit cells is greater than 50% the thickness of each unit cell, the overall size of the battery module constituted by the unit cells is increased, which is also not preferable.

Meanwhile, each unit module may be configured to have a structure in which plate-shaped battery cells, each of which has electrode terminals formed at the upper end and the lower end thereof, are connected in series to each other. For example, each unit module may include two or more battery cells, the electrode terminals of which are connected in series to each other, and a pair of high-strength cell covers coupled to cover the outside of the battery cells excluding the electrode terminals of the battery cells.

Each of the battery cells is a plate-shaped battery cell having a small thickness and a relatively large width and length so as to minimize the overall size of a battery module when the battery cells are stacked to constitute the battery module. In a preferred example, each of the battery cells may be a secondary battery configured to have a structure in which an electrode assembly is mounted in a battery case formed of a laminate sheet including a resin layer and a metal layer and electrode terminals protrude from the upper and lower ends of the battery case. Specifically, the electrode assembly may be mounted in a pouch-shaped case formed of an aluminum laminate sheet. The secondary battery with the above-described structure may also be referred to as a pouch-shaped battery cell.

Each of the battery cells may be a secondary battery, such as a nickel metal hydride secondary battery or a lithium secondary battery. The lithium secondary battery is particularly preferable since the lithium secondary battery has high energy density and discharge voltage.

In accordance with another aspect of the present invention, there is provided a battery pack including a plurality of battery modules, each having a battery cell or a unit module (unit cell) that can be charged and discharged, mounted in a pack case, wherein one or more unit cells constitute one battery module, two or more battery modules are arranged in a length direction of the battery pack to constitute one battery module group, two battery module groups are arranged symmetric with respect to a coolant discharge part, a coolant inlet port is independently formed at a region of the pack case corresponding to each of the battery modules located at a position opposite to the coolant discharge part, the battery modules are spaced apart from the pack case, at which the coolant inlet ports are formed, such that coolant flow sections, in which coolant introduced through the coolant inlet ports is distributed and then moves to the battery modules, are defined between the pack case and the battery modules, and a coolant outlet port is formed at a front or a rear of the pack case in the length direction of the battery pack such that the coolant introduced through the respective coolant inlet ports cools the unit cells of the respective battery modules while passing through the respective battery modules and is then discharged out of the pack case.

In the battery pack having the above-stated structure, the battery modules are arranged in a state in which the battery modules are spaced apart from the pack case such that coolant flow sections, in which the coolant is distributed, are defined between the battery modules and the pack case. In this case, it is possible to omit a process of sealing between the coolant inlet ports and the battery modules. In addition, it is possible to form the coolant inlet ports such that the coolant inlet ports have the same size. Consequently, it is possible to configure the battery pack such that the battery pack has a compact structure and to reduce manufacturing cost of the battery pack.

Specifically, the coolant introduced through the coolant inlet ports adjacent to the coolant outlet port is distributed in the coolant flow sections and then moves to the battery modules away from the coolant outlet port to cool the battery modules away from the coolant outlet port, thereby achieving uniform cooling of the battery modules.

Furthermore, in the battery pack according to the present invention, the coolant inlet port is independently formed at the region of the pack case corresponding to each battery module located at the position opposite to the coolant discharge part. Consequently, it is possible to reduce the flow length and flow speed of the coolant by half and, therefore, it is possible to reduce temperature deviation and differential pressure caused in the battery modules in the flow direction of the coolant.

Meanwhile, various structures may be provided to uniformly cool the respective battery modules.

For example, the respective battery modules constituting the battery module groups may have the same width and the width of the coolant inlet port adjacent to the coolant outlet port may be equal to the width of the coolant inlet port away from the coolant outlet port.

In another example, the coolant inlet ports may be formed at regions of the pack case corresponding to the respective battery modules on the opposite side of the coolant outlet port. Specifically, the coolant inlet ports may be formed at regions of the pack case corresponding to the respective battery modules on the opposite side of the coolant outlet port on the basis of a horizontal axis of each battery module.

Preferably, the coolant inlet ports are formed at regions of the pack case corresponding to outer edges of the respective battery modules on the opposite side of the coolant outlet port, thereby achieving uniform cooling of the battery modules.

In a concrete example, the width of each coolant inlet port may be equivalent to 5 to 50% the length of each battery module. In a case in which each coolant inlet port is configured to have a structure including a plurality of through holes or slits as previously described, the width of each coolant inlet port may be the sum of the widths of the through holes or the slits. If the width of each coolant inlet port is less than 5% the length of each battery module, a sufficient amount of coolant to cool the battery modules may not be introduced through the coolant inlet ports, which is not preferable. On the other hand, if the width of each coolant inlet port is greater than 50% the length of each battery module, the battery pack may not be uniformly cooled, which is also not preferable.

The width of each coolant flow section may be equivalent to 1 to 20% the width of each battery module.

Specifically, if the width of each coolant flow section is less than 1% the width of each battery module or greater than 20% the width of each battery module, coolant introduced through the coolant inlet ports adjacent to the coolant outlet port may not be effectively distributed to the battery modules away from the coolant inlet ports, which is not preferable.

Although the flow speed or the flow rate of the coolant introduced through the coolant inlet ports adjacent to the coolant outlet port is higher than the flow speed or the flow rate of the coolant introduced through the coolant inlet ports away from the coolant outlet port, the flow speed or the flow rate of the coolant having passed through the battery modules adjacent to the coolant outlet port may be equal to the flow speed or the flow rate of the coolant having passed through the battery modules away from the coolant outlet port, thereby achieving efficient cooling of the battery modules.

Meanwhile, the coolant may be, for example, air. However, the present invention is not limited thereto.

The battery pack may be mounted in a rack of a power storage device in a drawer-typed packaging manner.

In accordance with a further aspect of the present invention, there is provided a device, such as an electric vehicle, a hybrid electric vehicle, a plug-in hybrid electric vehicle, or a power storage device, using the battery pack with the above-stated construction as a power source.

Particularly, in a case in which the battery pack is used in the electric vehicle, the hybrid electric vehicle, or the plug-in hybrid electric vehicle as the power source, the battery pack may be mounted in a trunk of the vehicle.

The electric vehicle, the hybrid electric vehicle, the plug-in hybrid electric vehicle, and the power storage device using the battery pack as the power source are well known in the art to which the present invention pertains and thus a detailed description thereof will be omitted.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 2:
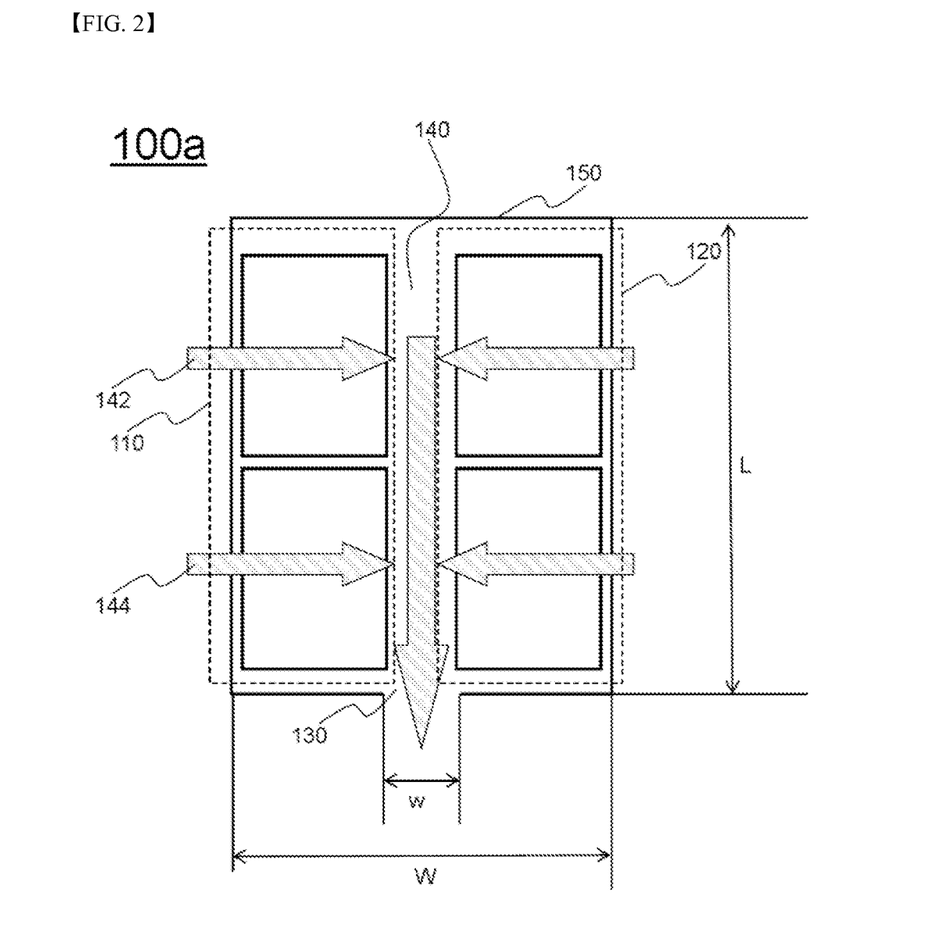
FIG. 2 is a plan view showing a battery pack according to an embodiment of the present invention.
Figure 3:
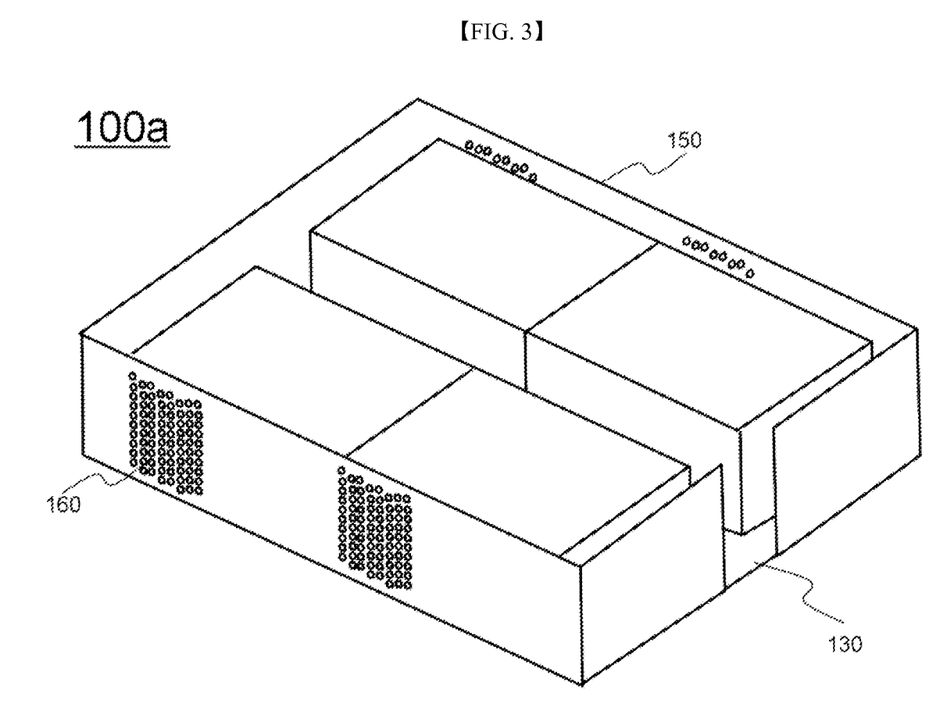
FIG. 3 is a perspective view of the battery pack shown in FIG. 2.

FIG. 2 is a plan view typically showing a battery pack according to an embodiment of the present invention and FIG. 3 is a perspective view typically showing the battery pack of FIG. 2.

Referring to these drawings, a battery pack 100a is configured to have a structure in which two battery module groups 110 and 120, each of which includes two battery modules arranged in a length direction L of the battery pack 100a, are mounted in a pack case 150.

In addition, the two battery module groups 110 and 120 are arranged in a width direction W of the battery pack 100a in a state in which the battery module groups 110 and 120 are spaced apart from each other such that a coolant discharge part 140 is defined between the battery module groups 110 and 120. A coolant inlet port 160 is independently formed at a region of the pack case 150 corresponding to each of the battery modules located at a position opposite to the coolant discharge part 140.

Furthermore, a coolant outlet port 130 is formed at the front of the pack case 150 in the length direction L of the battery pack 100a such that coolant introduced through the respective coolant inlet ports 160 cools unit cells of the respective battery modules while passing through the respective battery modules and is then discharged out of the pack case 150.

Each coolant inlet port 160 is configured to have a structure including a plurality of through holes. The coolant inlet ports 160 are formed at the pack case 150. The coolant discharge part 140 has a width w equivalent to about 20% the width W of the battery pack 100a.

In addition, the battery modules include coolant flow channels 142 and 144. The coolant flow channels 142 and 144 extend to the coolant outlet port 130 in a "¬" shape. The length L of the battery pack 100a is equivalent to 1.3 times the width W of the battery pack 100a.

Meanwhile, the battery pack 100a is symmetric with respect to the coolant discharge part 140.

Figure 4:
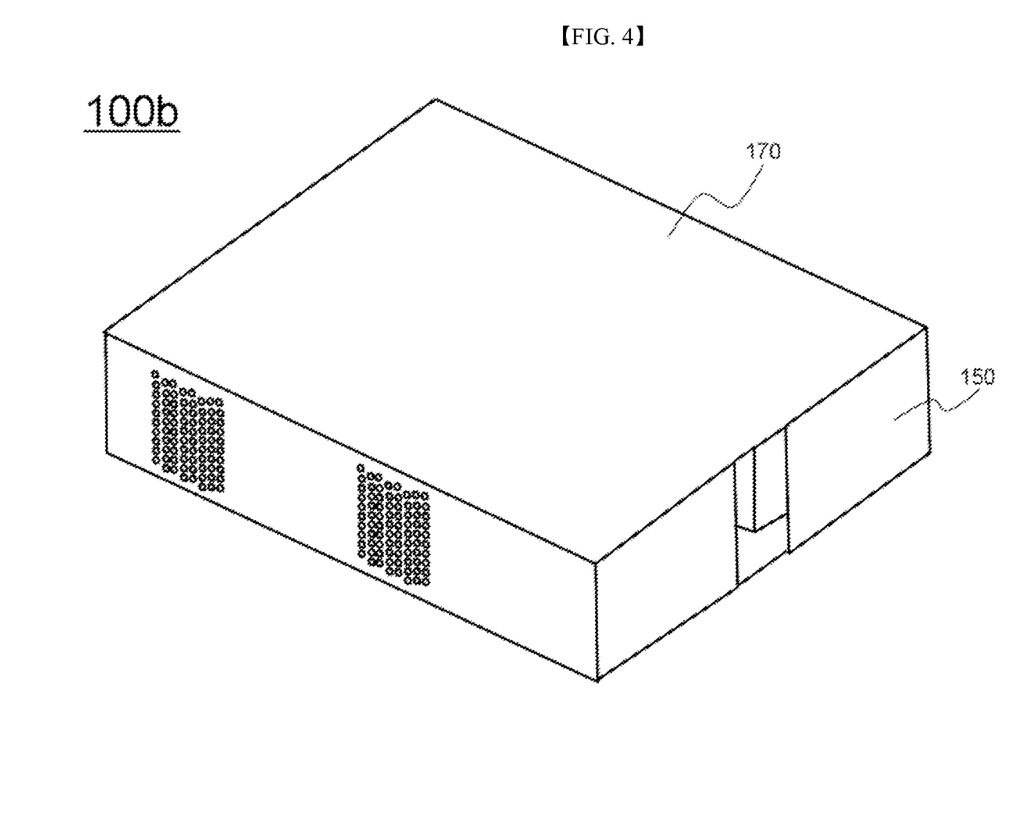
FIG. 4 is a perspective view showing a battery pack according to another embodiment of the present invention.

FIG. 4 is a perspective view typically showing a battery pack according to another embodiment of the present invention.

The battery pack of FIG. 4 is identical in structure to the battery pack of FIG. 3 except that the pack case includes a lower case 150, in which the battery modules are mounted, and an upper case 170 to cover the top of the lower case 150 and, therefore, a detailed description thereof will be omitted.

Figure 5:
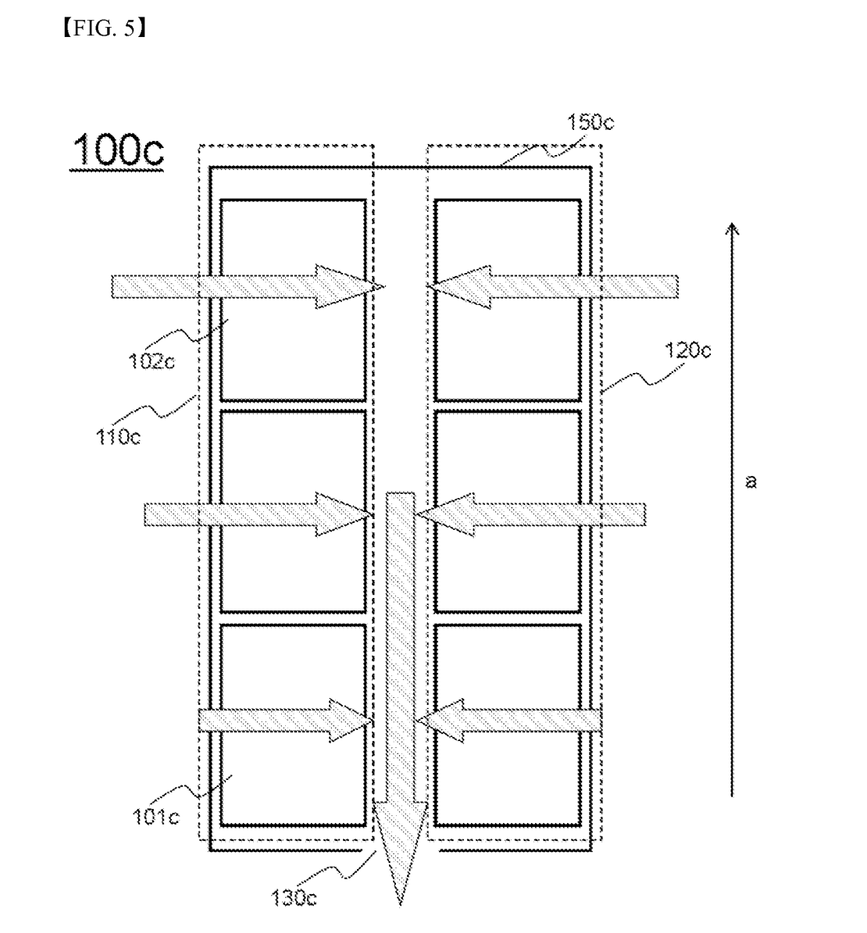
FIGS. 5 to 7 are plan views showing battery packs according to other embodiments of the present invention.
Figure 6:
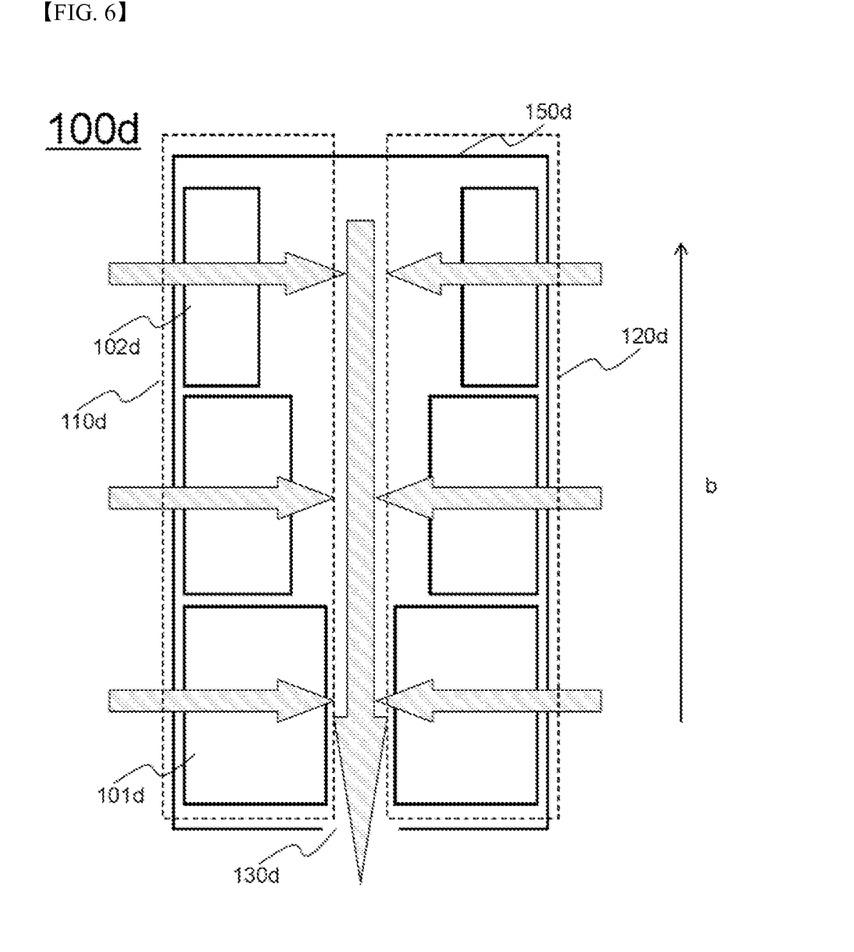
Figure 7:
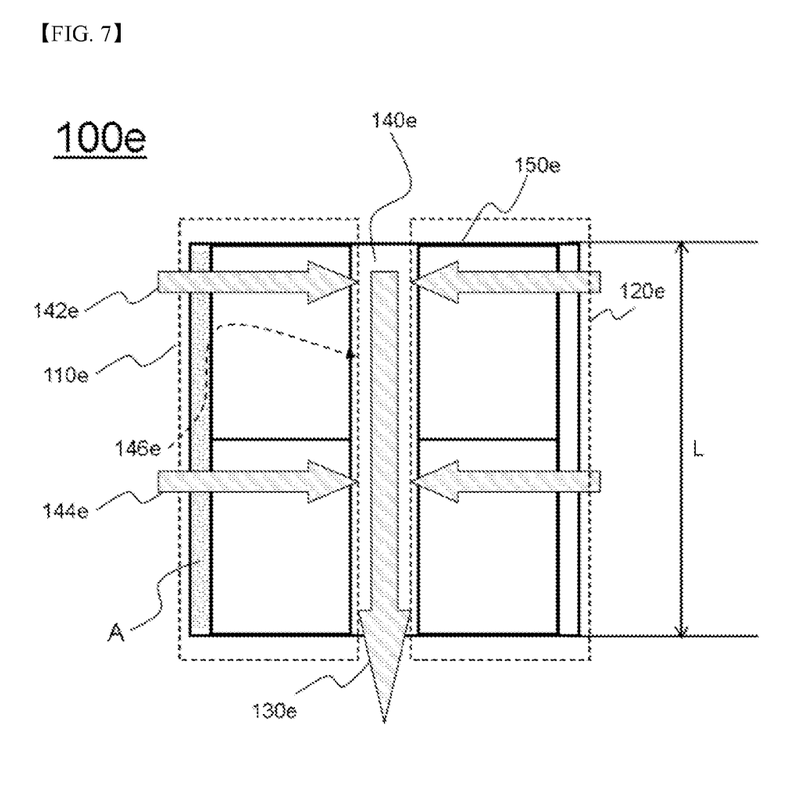

FIGS. 5 to 7 are plan views typically showing battery packs according to other embodiments of the present invention.

Referring first to FIG. 5, a battery pack 100c is configured to have a structure in which battery modules constituting battery module groups 110c and 120c have the same width and flow speed of coolant introduced into the battery modules is set such that flow speed of coolant introduced into a battery module 102c away from a coolant outlet port 130c is higher than flow speed of coolant introduced into a battery module 101c adjacent to the coolant outlet port 130c.

Specifically, the flow speed of the coolant at the respective battery module groups 110c and 120c is set to be linearly increased along longitudinal arrangement a of the battery modules.

Referring now to FIG. 6, a battery pack 100d is configured to have a structure in which flow speed of coolant introduced into battery modules constituting battery module groups 110d and 120d is set to be uniform and the widths of the battery modules, through which the coolant passes, are set such that the width of a battery module 102d away from a coolant outlet port 130d is less than the width of a battery module 101d adjacent to the coolant outlet port 130d.

Specifically, the widths of the respective battery modules constituting the battery module groups 110d and 120d are set to be linearly decreased along longitudinal arrangement b of the battery modules.

Figure 8:
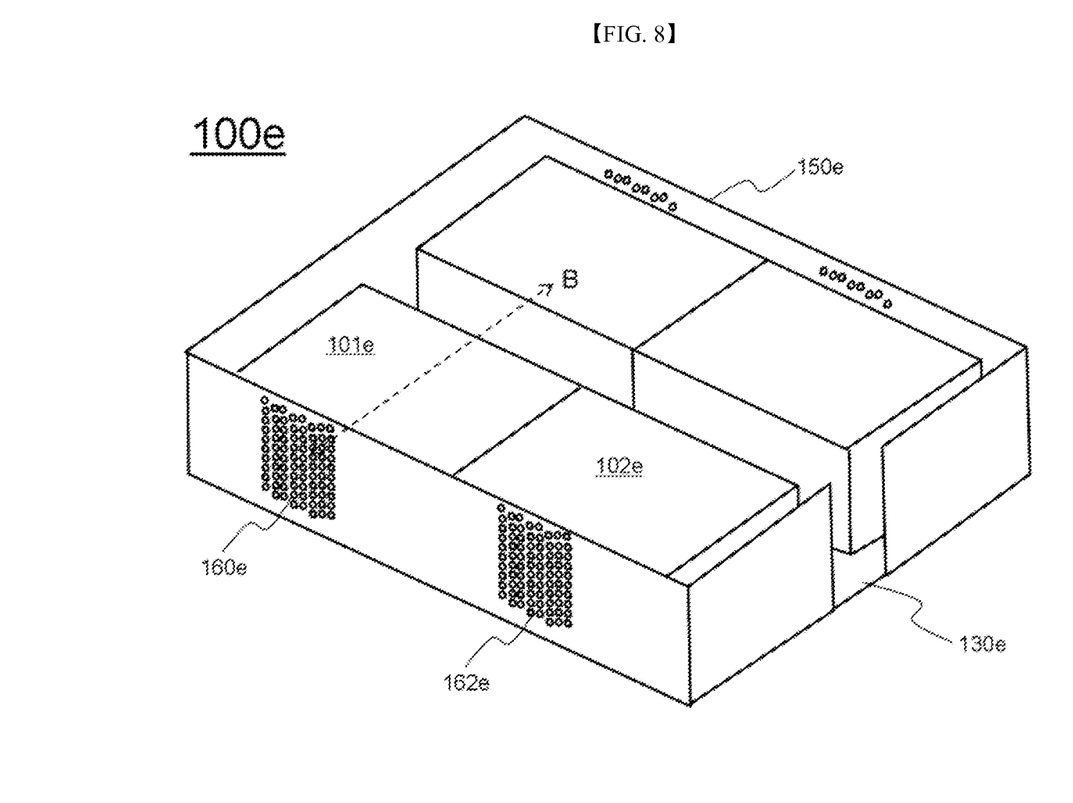
FIG. 8 is a perspective view of the battery pack shown in FIG. 7.

Referring to FIG. 7 together with FIG. 8, which is a perspective view of the battery pack shown in FIG. 7, a battery pack 100e is configured to have a structure in which two battery module groups 110e and 120e, each of which includes two battery modules arranged in a length direction L of the battery pack 100e, are mounted in a pack case 150e. For example, the battery module group 110e is configured to have a structure in which two battery modules 101e and 102e are arranged in the length direction L of the battery pack 100e. The battery modules 101e and 102e have the same width.

In addition, the two battery module groups 110e and 120e are arranged in a state in which the battery module groups 110e and 120e are spaced apart from the pack case 150e such that coolant flow sections A are defined between the battery module group 110e and the pack case 150e and between the battery module group 120e and the pack case 150e. Coolant inlet ports 160e and 162e are formed at regions of the pack case 150 corresponding to the respective battery modules at positions opposite to a coolant discharge part 140e.

A coolant outlet port 130e is formed at the front of the pack case 150e in the length direction L of the battery pack 100e such that coolant introduced through the respective coolant inlet ports 160e and 162e cools unit cells of the respective battery modules 101e and 102e while passing through the respective battery modules 101e and 102e and is then discharged out of the pack case 150e.

In particular, the coolant flow section A, in which the coolant introduced through the coolant inlet ports 160e and 162e is distributed and then moves to the battery modules 101e and 102e, is defined between the battery modules 101e and 102e and the pack case 150e. Consequently, a portion 146e of coolant 144e introduced through the coolant inlet port 162e adjacent to the coolant outlet port 130e is distributed to cool the battery module 101e away from the coolant outlet port 130e. On the other hand, a portion of the coolant introduced through the coolant inlet port 160e away from the coolant outlet port 130e may be distributed to cool the battery module 102e adjacent to the coolant outlet port 130e. As a result, flow rates of the coolant having passed through the respective battery modules 101e and 102e are the same although a flow rate 144e of the coolant introduced through the coolant inlet port 162e adjacent to the coolant outlet port 130e is higher than a flow rate 142e of the coolant introduced through the coolant inlet port 160e away from the coolant outlet port 130e.

Each of the coolant inlet ports 160e and 162e is configured to have a structure including a plurality of through holes. The coolant inlet ports 160e and 162e are formed at the pack case 150e. For example, the coolant inlet ports 160e and 162e are formed at regions of the pack case 150e corresponding to outer edges of the respective battery module groups 110e and 120e.

In addition, the coolant inlet ports 160e and 162e are formed at the pack case 150e on the opposite side of the coolant outlet port 130e on the basis of a horizontal axis B of the battery module 101e.

The width of each coolant inlet port 160e, i.e. the sum of the widths of the through holes, is equivalent to about 20% the length of each battery module. The coolant discharge part 140e has a width w equivalent to about 20% the width W of the battery pack 100e.

In addition, the battery modules include coolant flow channels 142e and 144e. The coolant flow channels 142e and 144e extend to the coolant outlet port 130e in a "¬" shape. The length L of the battery pack 100e is equivalent to 1.3 times the width W of the battery pack 100e.

Meanwhile, the battery module groups 110e and 120e are symmetric with respect to the coolant discharge part 140e.

Figure 9:
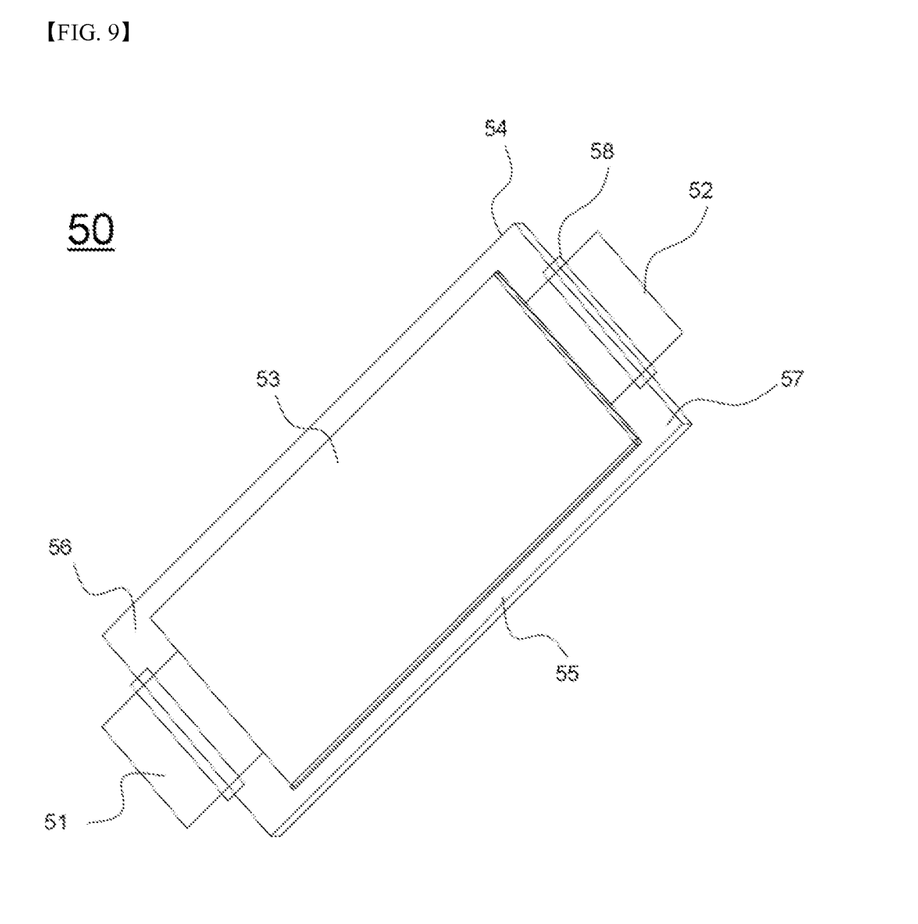
FIG. 9 is a perspective view showing a pouch-shaped battery cell.

FIG. 9 is a perspective view typically showing a pouch-shaped battery cell.

Referring to FIG. 9, a pouch-shaped battery cell 50 is configured to have a structure in which two electrode leads 51 and 52 protrude respectively from the upper end and the lower end of a battery cell body 53 such that the electrode leads 51 and 52 are opposite to each other. A sheathing member 54 includes upper and lower sheathing parts. That is, the sheathing member 54 is a two-unit member. In a state in which an electrode assembly (not shown) is mounted in a receiving part which is defined between the upper and lower sheathing parts of the sheathing member 54, opposite sides 55, upper ends 56, and lower ends 57, which are contact regions of the upper and lower sheathing parts of the sheathing member 54, are bonded to each other, whereby the battery cell 50 is manufactured.

The sheathing member 54 is configured to have a laminate structure of a resin layer/a metal film layer/a resin layer. Consequently, it is possible to bond the opposite sides 55, the upper ends 56, and the lower ends 57 of the upper and lower sheathing parts of the sheathing member 54, which are in contact with each other, to each other by applying heat and pressure to the opposite sides 55, the upper ends 56, and the lower ends 57 of the upper and lower sheathing parts of the sheathing member 54 so as to weld the resin layers thereof to each other. According to circumstances, the opposite sides 55, the upper ends 56, and the lower ends 57 of the upper and lower sheathing parts of the sheathing member 54 may be bonded to each other using a bonding agent. For the opposite sides 55 of the sheathing member 54, the same resin layers of the upper and lower sheathing parts of the sheathing member 54 are in direct contact with each other, whereby uniform sealing at the opposite sides 55 of the sheathing member 54 is accomplished by welding. For the upper ends 56 and the lower ends 57 of the sheathing member 54, on the other hand, the electrode leads 51 and 52 protrude from the upper ends 56 and the lower ends 57 of the sheathing member 54, respectively. For this reason, the upper ends 56 and the lower ends 57 of the upper and lower sheathing parts of the sheathing member 54 are thermally bonded to each other, in a state in which a film type sealing member 58 is interposed between the electrode terminals 51 and 52 and the sheathing member 54, in consideration of the thickness of the electrode leads 51 and 52 and the difference in material between the electrode leads 51 and 52 and the sheathing member 54, so as to increase sealability of the sheathing member 54.

Figure 10:
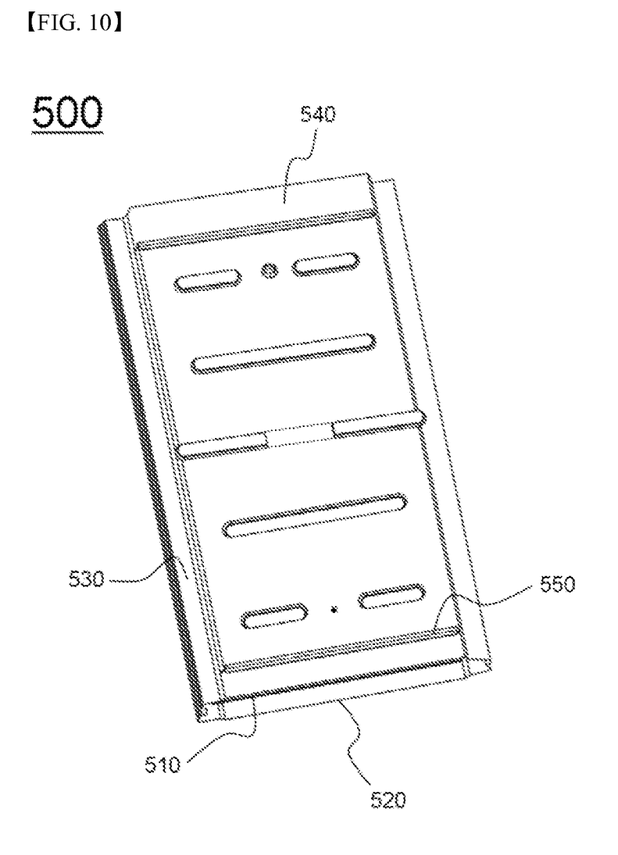
FIG. 10 is a perspective view showing a cell cover, in which the battery cell of FIG. 9 will be mounted to constitute a unit module.

FIG. 10 is a perspective view typically showing a cell cover, in which two battery cells, one of which is shown in FIG. 9, will be mounted to constitute a unit module.

Referring to FIG. 10, a cell cover 500 has two pouch-shaped battery cells (not shown), one of which is shown in FIG. 9, mounted therein. The cell cover 500 serves not only to increase mechanical strength of the battery cells but also to enable the battery cells to be easily mounted to a module case (not shown). The two battery cells are mounted in the cell cover 500 in a state in which one-side electrode terminals of the battery cells are connected in series to each other and are then bent in tight contact.

The cell cover 500 includes a pair of members 510 and 520 which are configured to be coupled to each other. The cell cover 500 is made of a high-strength metal sheet. Steps 530 to enable the module to be easily fixed are formed at left and right side edges of the cell cover 500 and steps 540 having the same function are also formed at the upper end and the lower end of the cell cover 500. In addition, fixing parts 550 are formed at the upper end and the lower end of the cell cover 500 such that the fixing parts 550 extend in the width direction of the cell cover 500. Consequently, the cell cover 500 is easily mounted to the module case (not shown).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery pack according to the present invention is configured to have a structure in which two battery module groups are arranged in a width direction of the battery pack in a state in which the battery module groups are spaced apart from each other such that a coolant discharge part is defined between the battery module groups. Consequently, it is not necessary to form a coolant discharge part at the upper part or the lower part of a pack case and, therefore, it is possible to configure the battery pack such that the battery pack has a compact structure in a vertical direction.

In addition, the battery pack according to the present invention is configured to have a structure in which a coolant inlet port is independently formed at a region of the pack case corresponding to each battery module located at a position opposite to the coolant discharge part. Consequently, it is possible to reduce the flow length and flow speed of coolant by half and, therefore, it is possible to reduce temperature deviation and differential pressure caused in the battery modules in a flow direction of the coolant.

Furthermore, the battery modules are arranged in a state in which the battery modules are spaced apart from the pack case such that coolant flow sections, in which the coolant is distributed, are defined between the battery modules and the pack case. In this case, it is possible to omit a process of sealing between the coolant inlet ports and the battery modules. In addition, it is possible to form the coolant inlet ports such that the coolant inlet ports have the same size. Consequently, it is possible to configure the battery pack such that the battery pack has a compact structure and to reduce manufacturing cost of the battery pack.

The invention claimed is:

1. A battery pack, comprising:
a pack case having a front wall, a rear wall and a pair of exterior sidewalls extending between the front wall and rear wall in a length direction of the pack case; and
a plurality of battery modules mounted in the pack case, each battery module having a unit cell that can be charged and discharged, wherein
two or more unit cells constitute one battery module,
two or more battery modules are arranged in the length direction of the battery pack to constitute one battery module group,
two battery module groups are arranged in a width direction of the battery pack, the battery module groups spaced apart from each other in the width direction to define a coolant discharge part between the battery module groups,
the pack case comprises a lowercase, in which the battery modules are mounted, and an upper case to cover a top of the lowercase,
coolant inlet ports are formed in the exterior sidewalls of the lower case corresponding to each of the battery modules so that a number of inlet ports is equal to a number of battery modules and each coolant inlet port cools a respective battery module, and
a coolant outlet port is formed in the front wall or rear wall of the pack case such that coolant introduced through the respective coolant inlet ports cools the unit cells of the respective battery modules while passing through the respective battery modules and is then discharged out of the pack case,
wherein the respective battery modules constituting the battery module groups have the same width, and a flow speed or a flow rate of the coolant introduced into the battery modules is set such that the flow speed or the flow rate of the coolant introduced into the battery module away from the coolant outlet port is higher than the flow speed or the flow rate of the coolant introduced into the battery module adjacent to the coolant outlet port, and
wherein the flow speed or the flow rate of the coolant at the battery module groups is set to be linearly increased along a longitudinal arrangement of the battery modules.

2. The battery pack according to claim 1, wherein each coolant inlet port is formed at the pack case while having a structure comprising a plurality of through holes or slits.

3. The battery pack according to claim 1, wherein the battery modules are spaced apart from the pack case, at which the coolant inlet ports are formed, such that coolant flow sections, in which the coolant introduced through the coolant inlet ports is distributed and then moves to the battery modules, are defined between the pack case and the battery modules.

4. The battery pack according to claim 1, wherein the widths of the respective battery modules constituting the battery module groups are set to be linearly decreased along longitudinal arrangement of the battery modules.

5. The battery pack according to claim 1, wherein the coolant discharge part has a width equivalent to 5 to 50% the width of the battery pack.

6. The battery pack according to claim 1, wherein each battery module comprises a coolant flow channel extending to the coolant outlet port in a "¬" shape.

7. The battery pack according to claim 1, wherein a driving fan to provide flow driving force to the coolant is further mounted in each coolant inlet port and/or the coolant outlet port.

8. The battery pack according to claim 1, wherein the coolant inlet ports and/or the coolant outlet port is connected to an air conditioner system.

9. The battery pack according to claim 1, wherein the battery pack is symmetric with respect to the coolant discharge part.

10. The battery pack according to claim 1, wherein the unit cells are spaced apart from each other by a size equivalent to 5 to 50% a thickness of each unit cell.

11. The battery pack according to claim 1, wherein the respective battery modules constituting the battery module groups have the same width, and a width of the coolant inlet port adjacent to the coolant outlet port is equal to a width of the coolant inlet port away from the coolant outlet port.

12. The battery pack according to claim 1, wherein the coolant inlet ports are formed at regions of the pack case corresponding to the respective battery modules on the opposite side of the coolant outlet port on the basis of a horizontal axis of each battery module.

13. The battery pack according to claim 12, wherein the coolant inlet ports are formed at regions of the pack case corresponding to outer edges of the respective battery modules on the opposite side of the coolant outlet port.

14. A battery pack comprising:
a pack case having a front wall, a rear wall and a pair of exterior sidewalls extending between the front wall and rear wall in a length direction of the pack case; and
a plurality of battery modules mounted in the pack case, each battery module having a unit cell that can be charged and discharged, wherein
one or more unit cells constitute one battery module,
two or more battery modules are arranged in the length direction of the battery pack to constitute one battery module group,
two battery module groups are arranged symmetric with respect to a coolant discharge part,
the pack case comprises a lowercase, in which the battery modules are mounted, and an upper case to cover a top of the lowercase,
coolant inlet ports are formed in the exterior sidewalls of the lower case corresponding to each of the battery modules so that a number of inlet ports is equal to a number of battery modules and each coolant inlet port cools a respective battery module,
the battery modules are spaced apart from the pack case, at which the coolant inlet ports are formed, such that coolant flow sections, in which coolant introduced through the coolant inlet ports is distributed and then moves to the battery modules, are defined between the pack case and the battery modules, and
a coolant outlet port is in the front wall or rear wall of the battery pack such that the coolant introduced through the coolant inlet ports cools the unit cells of the respective battery modules while passing through the respective battery modules and is then discharged out of the pack case,
wherein the respective battery modules constituting the battery module groups have the same width, and a flow speed or a flow rate of the coolant introduced into the battery modules is set such that the flow speed or the flow rate of the coolant introduced into the battery module away from the coolant outlet port is higher than the flow speed or the flow rate of the coolant introduced into the battery module adjacent to the coolant outlet port, and
wherein the flow speed or the flow rate of the coolant at the battery module groups is set to be linearly increased along a longitudinal arrangement of the battery modules.

15. The battery pack according to claim 1, wherein the coolant is air.

16. The battery pack according to claim 1, wherein the battery pack is mounted in a rack of a power storage device in a drawer-typed packaging manner.

17. A device using a battery pack according to claim 1 as a power source, wherein the device is any one selected from among an electric vehicle, a hybrid electric vehicle, a plug-in hybrid electric vehicle, and a power storage device.

18. The battery pack according to claim 14, wherein the coolant is air.

19. The battery pack according to claim 14, wherein the battery pack is mounted in a rack of a power storage device in a drawer-typed packaging manner.

20. A device using a battery pack according to claim 14 as a power source, wherein the device is any one selected from among an electric vehicle, a hybrid electric vehicle, a plug-in hybrid electric vehicle, and a power storage device.

* * * * *